July 18, 1961  L. S. MAY  2,992,484
GRAPHOMETERS
Filed Jan. 19, 1960

INVENTOR.
LUKE S. MAY

2,992,484
GRAPHOMETERS
Luke S. May, 843 Henry Bldg., Seattle, Wash.
Filed Jan. 19, 1960, Ser. No. 3,285
3 Claims. (Cl. 33—1)

The invention relates to an improvement in graphometers an instrument for the comparison, examination, measurement and checking of the angularity of forms, lines, designs, angles, letters, figures, and the like in line drawings, maps, photographs, handwritings, printing and the like. It has a particular application in the analysis of handwriting and the measurement and comparison of the angles and the slant of writing. One of its main uses is in the examination of disputed documents, wherein many comparative measurements have to be made at a plurality of points as to the angle or slant of certain lines, pen and pencil marks, typewritten characters, print script, printed letters and figures.

An additional object is to provide a graphometer which permits the simultaneous comparative measuring of several specimens and their ocular comparison in an extended field unobstructed except for the lines of the instrument which show the degree of angle or slant at a plurality of different points.

An additional object is to provide an improved graphometer that is compact and simple in construction, which when manufactured in a universal size model may readily be carried in a brief case.

An additional object is to provide an improved graphometer which affords substantially complete visibility therethrough and which while detachable from its base is applicable directly to the surfaces of large sheets of blue prints, line drawings, maps photographs and the like to check, compare and measure the angularity of forms, lines, designs and the like thereon.

An additional object is to provide an improved graphometer with which the average slant, the maximum variation of slant and other factors pertaining to angularity in writing, typing and printing, may be more quickly and accurately determined in degrees of angle.

An additional object is to provide an improved graphometer having a plurality of many base lines to facilitate the accurate arranging of a plurality of specimens of writing, typing, printing or like matter parallel to a common base line of a protractor for simultaneous measurement and comparison at a plurality of points.

Figure 1:
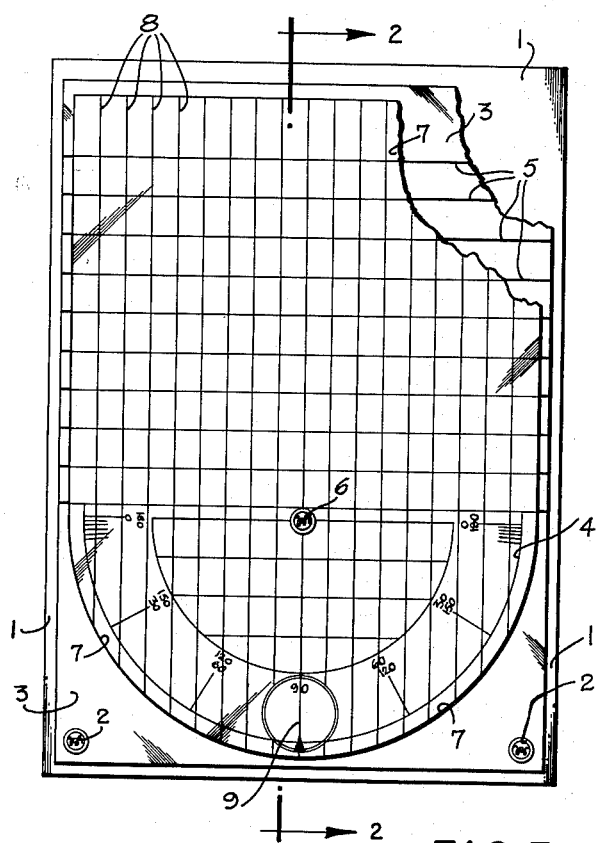
FIGURE 1 is a plan view of the angle measuring instrument of the invention.
Figure 2:
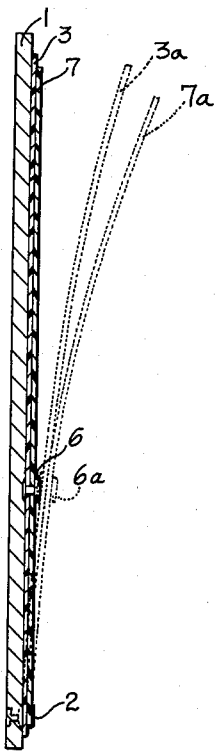
FIGURE 2 is a sectional view on the line 2—2 of FIGURE 1.
Figure 3:
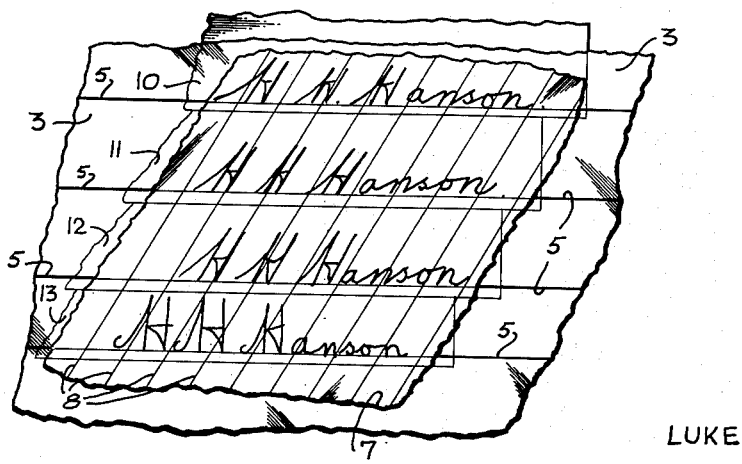
FIGURE 3 is an illustration of the manner in which several separate specimens of handwriting, such as signatures on checks, may be precisely measured and simultaneously compared as to slant at a plurality of points.

In the drawings 1 is a base member or object board of suitable material, shape, thickness and size for example generally rectangular in shape and of a size somewhat larger than the superposed member 3 and 7 and somewhat larger than the average size sheet of letter paper. The protractor end of the transparent sheet 3 is fastened on to the base 1 near one end of the base 1 with the detachable snap fasteners 2, 2 or with other suitable means allowing the upper members of the instrument transparent sheets 3 and 7, which are pivotally fastened together, to be removed from base member 1 and placed on objects which are too large in area to be inserted and held in place between the base member object board 1 and transparent sheet 3.

3 is a thin transparent sheet of suitable material such as celluloid or plastic on which there is ruled, imprinted or etched a plurality of many spaced base lines 5 paralleling the base line of a 180 degree indexed semicircular protractor scale 4 a pivot pin 6 with a snap or other suitable detachable top fastening is provided to hold sheets 3 and 7 together and form an axis about which sheet 7 pivots above sheet 3 the positioning point 9 on sheet 7 indicates the degree of angle formed at a plurality of many points where the many parallel lines 8 on sheet 7 intersect the base lines 5 on sheet 3. The thin transparent sheet 7 is ruled with a plurality of many spaced parallel lines 8 ruled, imprinted or etched on its surface with a hole located on the medial pivot line to receive the pivot pin axis 6 so disposed that the positioning point 9 will co-operate with the degree scale of the protractor 4 when the sheet 7 is rotated or pivoted on the pin 6 the positioning point 9 being also located on the medial pivot point line.

Removing the detachable top fastening from the pivot pin 6 the sheet 7 may quickly be removed and interchanged with other similar sheets which may have differently spaced parallel lines or on which the parallel lines may be obliquely positioned on a rectangular sheet, as an example by having the parallel lines ruled diagonally across the sheet 7 at an angle of fifty two degrees very little rotating movement of the sheet 7 would be required in examining and measuring a page of modern American writing as much of it is written with a slant of fifty two degrees on the down strokes.

The instrument may be made in different sizes and may be made with a different number and spacing of the parallel base lines 5 on sheet 3 but will generally be made with about twelve of the base lines 5 depending on a universal or more particular use for which the instrument may be specially manufactured.

The instrument may be made with a different number and spacing of the parallel lines 8 on sheet 7 depending on the special use which some instruments may be adapted for examining certain kinds of typing, printing and writing but as an example generally having about thirty-six to a rectangular sheet 7 that is eight inches wide which has been found suitable to use on the average letter size pages of typing and writing. The dotted lines 3a, 7a, and 6a, in the cross section view show how the unattached end of the transparent sheet 3 and the sheet 7 and the pivot pin fastening the two sheets together may be raised to arrange specimens for examination and measurement when the sheets 3 and 7 are made of flexible material. When the specimens to be examined are placed on the base member 1 under the sheet 3 and arranged in alignment with the base lines 5 the specimens are held in place by the sheet 3 allowing the sheet 7 to be pivoted or rotated about over sheet 3 without disturbing or disarranging the specimens thereby facilitating the taking of measurements and making comparisons of a plurality of specimens at a plurality of many points simultaneously.

10, 11, 12 and 13 represent the signatures on four different documents as compared and measured when inserted and held in place between the base or object board 1 and the transparent sheet 3, the documents being arranged under and in alignment with base lines 5 on sheet 3. The transparent sheet 7 being rotated to bring the parallel lines in alignment with the downstrokes of the capital "H'S" in the signatures 10, 11, and 12 the exact slant in degrees may then be read directly at positioning point 9 on the protractor scale 4. The exact degree of variance between the downstrokes in 10, 11, 12 and the downstrokes in 13 can then be quickly determined by rotating sheet 7 to bring the parallel lines on 7 in alignment with the downstrokes of the letters in 13.

Another example of its use is in accurately comparing and showing the similarity or variance in degrees of the angles formed by the lines of such letters as A, W, K, M, N, X, Y and Z in a plurality of specimens in counterfeit and disputed printed and typed documents.

The thin, clear transparent sheets of the instrument provide a means whereby the specimens underneath may be readily photographed through the sheets for record and demonstrative purposes with the indicating point 9 accurately showing the angle of the measurement at and for comparison at a plurality of many points.

Although described in its preferred form with a certain degree of particularity having transparent sheets with the parallel lines covering an area of roughly 8 by 10 inches suitable for the examination of average letter size pages, of writing, typing and printing, it may be made in various sizes, shapes and dimensions. It is understood that the form outlined is only by way of example and that various modifications within the purpose and scope of the invention may be resorted to. It is therefore intended that no limitations be placed on the invention except as defined by the scope of the following claims:

I claim:

1. A graphometer angle and slant measuring instrument for the simultaneous comparison and measurement of a plurality of several specimens of handwriting, typewriting, printing and like matter comprising in combination, a flat base member with means at one end for attaching and holding in position a second member, a second member consisting of a sheet of thin transparent material on which there is ruled, imprinted or etched a plurality of many spaced parallel lines which are parallel to the baseline of a semicircular 180 degree protractor scale on said second member, a pivot pin at the center of the base line of said protractor adapted to form an axis, a third member consisting of a transparent sheet pivotally mounted on and fastened to said axis and rotatable over said second sheet, said third member consisting of a thin sheet of transparent material having on it a plurality of many spaced parallel lines with an indicating point on a medial line extending from said pivot pin near one end of the sheet so disposed that when the upper sheet is pivotally rotated the said indicating point co-operates with the index scale of the 180 degree protractor indicating on the scale the degree of angularity formed at a plurality of the many places where the many parallel lines on the upper sheet member intersect the many line paralleling the protractor base line on said second member.

2. A combination as set forth in claim 1 in which the pivot pin fastening is of a detachable type allowing the upper sheet member to be removed and interchanged with sheets having different rulings.

3. A combination as set forth in claim 1 in which the means at one end of the flat base object board member for attaching and holding the second or lower sheet member in position is of a type that will permit the transparent sheet members to be quickly detached so they may be placed directly over large line drawings, maps, photographs and the like which are too large to be inserted and held in place between the object board and the lower transparent sheet member.

No references cited.